United States Patent
Hidaka

(10) Patent No.: US 7,493,980 B2
(45) Date of Patent: Feb. 24, 2009

(54) MODE TRANSITION CONTROL SYSTEM FOR HYBRID VEHICLE

(75) Inventor: Terumasa Hidaka, Kanagawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 68 days.

(21) Appl. No.: 11/411,954

(22) Filed: Apr. 27, 2006

(65) Prior Publication Data

US 2006/0243501 A1 Nov. 2, 2006

(30) Foreign Application Priority Data

Apr. 28, 2005 (JP) ............... 2005-133398

(51) Int. Cl.
*B60K 1/00* (2006.01)
*B60K 6/00* (2007.10)

(52) U.S. Cl. ............ 180/65.2; 180/65.3; 903/906

(58) Field of Classification Search ........ 180/65.2, 180/65.3, 65.6, 65.8, 165; 903/903, 910, 903/918, 923; 701/22, 83; 475/5, 8

See application file for complete search history.

(56) References Cited

U.S. PATENT DOCUMENTS

| 5,895,333 | A | * | 4/1999 | Morisawa et al. ............ 475/5 |
| 6,158,541 | A | * | 12/2000 | Tabata et al. .............. 180/165 |
| 6,359,345 | B1 | | 3/2002 | Suzuki | |
| 6,428,444 | B1 | * | 8/2002 | Tabata ................ 180/65.2 |
| 6,615,940 | B2 | * | 9/2003 | Morisawa .............. 180/65.1 |
| 6,655,485 | B1 | * | 12/2003 | Ito et al. ................ 180/65.6 |
| 6,837,816 | B2 | * | 1/2005 | Tsai et al. .................. 475/5 |
| 6,994,177 | B2 | * | 2/2006 | Ito et al. ............... 180/65.2 |
| 2005/0143877 | A1 | * | 6/2005 | Cikanek et al. ............. 701/22 |

FOREIGN PATENT DOCUMENTS

| JP | 2002-144921 A | 5/2002 |
| JP | 2004-144921 A | 5/2002 |

* cited by examiner

*Primary Examiner*—Hau V Phan
(74) *Attorney, Agent, or Firm*—Foley & Lardner LLP

(57) ABSTRACT

A hybrid vehicle mode transition control apparatus includes a hybrid drive system having a first clutch disposed between an engine and a motor generator, and a second clutch disposed between the motor generator and wheels; an engine braking request judging section configured to judge whether a request of an engine braking is present during a motor regenerative braking performed by the motor generator, and a mode transition control section configured to perform a mode transition control of the hybrid drive system in accordance with a transition request. The mode transition control apparatus is configured to decrease a torque capacity of the second clutch being in an engaged state in response to the judgment that the request of the engine braking is present, and to bring the first clutch from a disengaged state to the engaged state to shift to the engine braking.

9 Claims, 3 Drawing Sheets

FIG.3A BRAKE
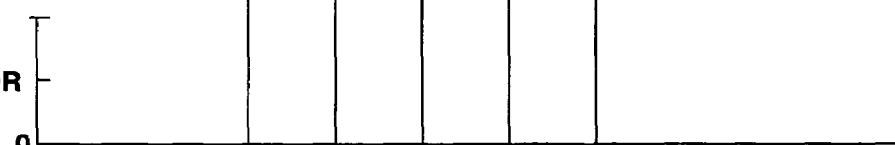
FIG.3B ACCELERATOR
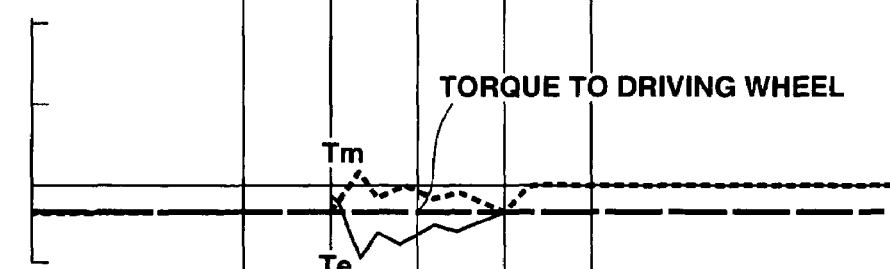
FIG.3C ENG MG TORQUE [Nm]
FIG.3D ENG MG ROTATIONAL SPEED [rpm]
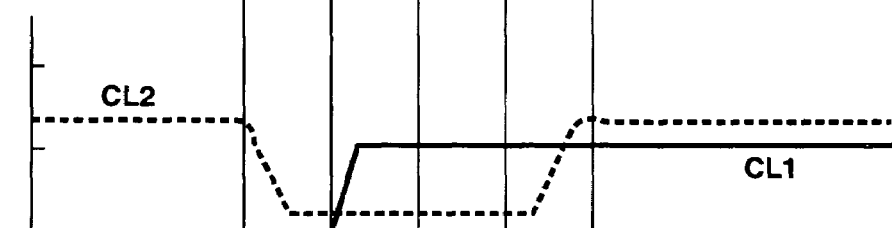
FIG.3E CLUTCH TORQUE CAPACITY [Nm]
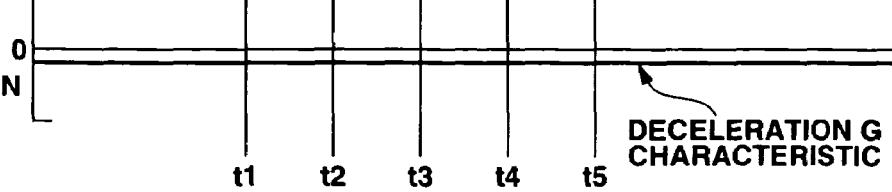
FIG.3F ACCELERATION G / DECELERATION G

MODE TRANSITION CONTROL SYSTEM FOR HYBRID VEHICLE

BACKGROUND OF THE INVENTION

The present invention relates to a mode transition control system for a hybrid vehicle with a hybrid drive system including a first clutch disposed between an engine and a motor generator, and a second clutch disposed between the motor generator and driving wheels.

Japanese Patent Application Publication No. 2002-144921 shows a control system for a hybrid vehicle including an engine, a motor generator used for drive, start, and power generation, and a clutch disposed between the engine and the motor generator. This control system eliminates loss of a regenerative quantity of electric energy by engine friction during a regenerative braking performed by the motor generator, by disconnecting the engine with a drivetrain. This control system can ensure the regenerative quantity fully and efficiently.

SUMMARY OF THE INVENTION

The above-mentioned control apparatus is arranged not to transmit the engine friction by disengagement of the clutch between the engine and the motor generator during the motor regenerative braking. In this control apparatus, the clutch which is in a disengaged state is reengaged in accordance with a request of shift from the motor regenerative braking to an engine braking, for example, when a battery charge capacity exceeds a predetermined value. Accordingly, it is problematical to generate larger shock by the inertia and the friction by the engine when the disengaged clutch is reengaged in accordance with the request of the shift.

It is an object of the present invention to provide a mode transition control system for a hybrid vehicle configured to shift smoothly from a motor regenerative braking to an engine braking, and thereby to prevent from affecting a driver's feeling adversely.

According to one aspect of the present invention, a mode transition control apparatus for a hybrid vehicle, the mode transition control apparatus comprises: a hybrid drive system including; a first clutch disposed between an engine and a motor generator; and a second clutch disposed between the motor generator and wheels; an engine braking request judging section configured to judge whether a request of an engine braking is present during a motor regenerative braking performed by the motor generator; and a mode transition control section configured to perform a mode transition control of the hybrid drive system in accordance with a transition request, to decrease a torque capacity of the second clutch being in an engaged state in response to the judgment that the request of the engine braking is present, and to bring the first clutch from a disengaged state to the engaged state to shift to the engine braking.

According to another aspect of the invention, a mode transition control method for a hybrid vehicle including a hybrid drive system having a first clutch disposed between an engine and a motor generator, and a second clutch disposed between the motor generator and wheels, the mode transition control method comprises: judging whether a request of an engine braking is present during a motor regenerative braking performed by the motor generator; performing a mode transition control of the hybrid drive system in accordance with a transition request; decreasing a torque capacity of the second clutch being in an engaged state in response to the judgment that the request of the engine braking is present; and bringing the first clutch from a disengaged state to the engaged state to shift to the engine braking.

According to still another aspect of the invention, a mode transition control apparatus for a hybrid vehicle, the mode transition control apparatus comprises: a hybrid drive system including; a first clutch disposed between an engine and a motor generator; and a second clutch disposed between the motor generator and wheels; first means for judging whether a request of an engine braking is present during a motor regenerative braking performed by the motor generator; second means performing a mode transition control of the hybrid drive system in accordance with a transition request; third means for decreasing a torque capacity of the second clutch being in an engaged state in response to the judgment that the request of the engine braking is present; and fourth means for bringing the first clutch from a disengaged state to the engaged state to shift to the engine braking.

BRIEF DESCRIPTION OF THE DRAWINGS

FIG. 3A is a time chart showing a characteristic of a depression degree of a brake pedal. FIG. 3B is a time chart showing a characteristic of an accelerator opening. FIG. 3C is a time chart showing a characteristic of generated torque of an engine E, and a characteristic of generated torque of a motor generator MG. FIG. 3D is a time chart showing a characteristic of an engine speed of engine E, and a characteristic of rotational speed of a motor generator MG. FIG. 3E is a time chart showing a characteristic of torque capacity of first clutch CL1, and a characteristic of torque capacity of second clutch CL2. FIG. 3F is a time chart showing a characteristic of deceleration G of the hybrid vehicle.

DETAILED DESCRIPTION OF THE INVENTION

Figure 1:
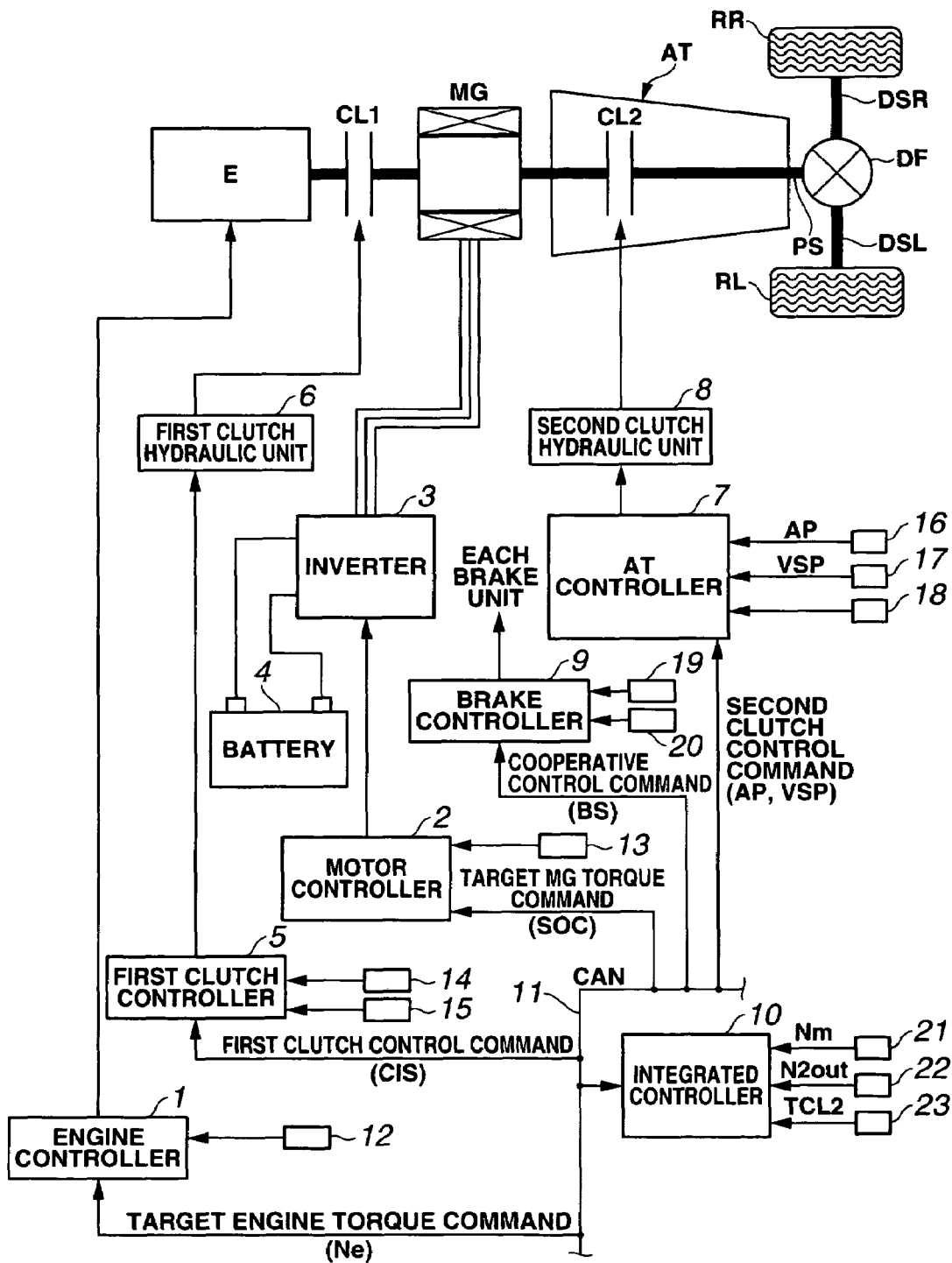
FIG. 1 is an overall view showing a rear-wheel drive hybrid vehicle equipped with a mode transition control system according to an embodiment of the present invention.

FIG. 1 shows an overall view showing a rear-wheel drive hybrid vehicle equipped with a regenerative braking control system according to an embodiment of the present invention. The drive system for the hybrid vehicle includes an engine E, a motor generator MG, a first clutch CL1, a second clutch CL2, an automatic transmission AT, a propeller shaft PS, a differential DF, a left drive shaft DSL, a right drive shaft DSR, a left rear wheel (driving wheel) RL, and a right rear wheel (driving wheel) RR.

Engine E is a gasoline engine or a diesel engine. Valve openings of throttle valves of engine E and so on are controlled in accordance with a control command from an engine controller 1 described later.

Motor generator MG is a synchronous motor generator including a rotor in which permanent magnets are embedded, and a stator provided with stator coils. Motor generator MG is controlled by being applied with three-phase alternative current generated by an inverter 3 in accordance with a control command from a motor controller 2 described later. Motor generator MG can act as a motor drivingly rotating by being supplied with power from a battery 4 (hereinafter referred to as power running), and can act as a generator to generate an electromotive force at both ends of each stator coil to charge battery 4 when the rotor is rotated by external force (hereinafter referred to as regeneration). Motor generator MG is connected with an input shaft of automatic transmission AT through a damper (not shown).

First clutch CL1 is a hydraulic single plate clutch disposed between engine E and motor generator MG. First clutch CL1 is controlled to engage or disengage (release) through slip engagement or slip disengagement (slip release) by a control hydraulic pressure generated by a first clutch hydraulic unit 6 in accordance with a control command from a first clutch controller 5 described below.

Second clutch CL2 is a hydraulic multiple plate clutch disposed between motor generator MG and left and right rear wheels RL and RR. Second clutch CL2 is controlled to engage or disengage through the slip engagement or the slip disengagement by a control hydraulic pressure generated by a second clutch hydraulic unit 8 in accordance with a control command from an AT controller 7 described below.

Automatic transmission AT is a transmission configured to switch stepped (finite) gear ratios such as five forward speeds and one reverse speed, and six forward speeds and one reverse speed automatically, in accordance with a vehicle speed and an accelerator opening and so on. Second clutch CL2 is not a special clutch equipped newly. Second clutch CL2 commonly uses some friction engagement elements of a plurality of friction engagement elements engaged at each speed of automatic transmission AT. The output shaft of automatic transmission AT is connected with left and right rear wheels RL, RR through propeller shaft PS, differential DF, left drive shaft DSL, and right drive shaft DSR.

Hereinafter, the control system of the hybrid vehicle according to the first embodiment is illustrated. The control system for the hybrid vehicle includes engine controller 1, motor controller 2, inverter 3, battery 4, first clutch controller 5, first clutch hydraulic unit 6, AT controller 7, second clutch hydraulic unit 8, a brake controller 9, and an integrated controller 10 as shown in FIG. 1. Engine controller 1, motor controller 2, first clutch controller 5, AT controller 7, brake controller 9, and integrated controller 10 are connected through CAN communication lines (CAN lines) 11 capable of exchanging information with each other.

Engine controller 1 receives information (signal) of an engine speed from an engine speed sensor 12. Engine controller 1 outputs a command for controlling an engine operating point (Ne, Te) to a throttle valve actuator (not shown) and so on, in accordance with a target engine torque command and so on from integrated controller 10. The information of engine speed Ne is supplied to integrated controller 10 through CAN lines 11.

Motor controller 2 receives information (signal) from a resolver 13 configured to sense a rotary position of the rotor of motor generator MG. Motor controller 2 outputs a command for controlling a motor operating point (Nm, Tm) of motor generator MG to inverter 3, in accordance with a target motor generator torque command and so on from integrated controller 10. Motor controller 2 monitors a battery SOC indicative of a charge state of battery 4. The information of battery SOC is used as the information for controlling motor generator MG, and supplied to integrated controller 10 through CAN lines 11.

First clutch controller 5 receives sensor information (signal) from a first clutch hydraulic pressure sensor 14 and a first clutch stroke sensor 15. First clutch controller 5 outputs a command for controlling the engagement/disengagement of first clutch CL1 to first clutch hydraulic unit 6, in accordance with a first clutch control command from integrated controller 10. The information of first clutch stroke C1S is supplied to integrated controller 10 through CAN lines 11.

AT controller 7 receives sensor information (signal) from an accelerator opening sensor 16, a vehicle speed sensor 17, and a second clutch hydraulic pressure sensor 18. AT controller 7 outputs a command for controlling the engagement/disengagement of second clutch CL2 to second clutch hydraulic unit 8 in an AT hydraulic pressure control valve, in accordance with a second clutch control command from integrated controller 10, prior to the control of the second clutch by shift control. The information of accelerator opening AP and vehicle speed VSP is supplied to integrated controller 10 through CAN lines 11.

Brake controller 9 receives sensor information (signal) from a wheel speed sensor 19 to sense wheel speed of each of four wheels, and a brake stroke sensor 20. When a desired braking force determined from a brake stroke BS is not satisfied only by the regenerative braking force at a braking performed by compression of a brake pedal, brake controller 9 performs a regenerative cooperative brake control in accordance with a regenerative cooperative brake control command from integrated controller 10 to compensate for the deficiency of the braking force by a mechanical braking force (hydraulic braking force and motor braking force).

Integrated controller 10 controls (monitors) energy consumption of overall vehicle, and operates to run the vehicle at peak efficiency. Integrated controller 10 receives information (signal) from a motor rotational speed sensor 21 configured to sense a motor rotational speed Nm, information (signal) from a second clutch output rotational speed sensor 22 configured to sense a second clutch output rotational speed N2out, information (signal) from a second clutch torque sensor 23 configured to sense a second clutch torque TCL2, and information (signal) through CAN lines 11. Integrated controller 10 controls engine E by the control command to engine controller 1, controls motor generator MG by the control command to motor controller 2, controls first clutch CL1 to engage or disengage by the control command to first clutch controller 5, and controls second clutch CL2 to engage or disengage by the control command to AT controller 7.

Information of input and output rotational speeds of first clutch CL1 and information of input and output rotational speeds of second clutch CL2 are obtained by these equations.

First clutch input rotational speed=engine speed Ne (engine speed sensor 12)

First clutch output rotational speed=motor rotational speed Nm (motor rotational speed sensor 21)

Second clutch input rotational speed=motor rotational speed Nm (motor rotational speed sensor 21)

Second clutch output rotational speed=second clutch output rotational speed N2out(second clutch output rotational speed sensor 22)

Hereinafter, basic operation mode of the hybrid vehicle according to the embodiment is illustrated.

[At rest] If battery SOC is low when the vehicle is stopped, engine E is started for the power generation, and battery 4 is charged. Then, battery SOC becomes within the normal range, and engine E is stopped with first clutch CL1 engaged and with second clutch CL2 disengaged.

[Start] When the vehicle is started by engine E, the rotation of engine E induces (causes) drag rotation of motor generator MG in accordance with accelerator opening AP and battery SOC state, and the vehicle is changed over to the power running/power generation. When the vehicle is started by motor generator MG, the output rotation of motor generator MG becomes negative rotation by roll back, and the slip control of second clutch CL2 is operated, so that the rotation of motor generator MG is held positively. Then, the driving force is increased until the vehicle is forwarded, and second clutch CL2 is shifted from the slip control to the engagement.

[Normal Driving (Constant Speed/Acceleration)]

When the vehicle is traveled by the motor, the motor torque and battery output necessary for the engine starting is ensured. When the motor torque and the battery output are deficient, the vehicle is shifted to run by the engine. To improve the fuel economy, the motor running and an adding charge by the power generation are concurrently performed. In this state, the vehicle can be traveled only at a low load state for conservation of the motor torque and the battery output. The adding charge by the power generation is performed to aim a lowest point of the fuel consumption of the engine, and to add the torque for the power generation to the torque necessary for the running of the vehicle. However, the power generation is not performed at the increasing of battery SOC. To improve response at the compression of the accelerator, motor generator MG assists a retarded amount of the engine torque.

[Deceleration] When the vehicle runs with the coast brake by the engine (no fuel consumption), the braking force is generated by the engine brake. During the motor regeneration, the braking force corresponding to the engine brake is generated. When the vehicle is decelerated by the brake operation, the braking force is attained by the regeneration cooperative brake control in accordance with the driver's brake operation. The vehicle speed at which the regeneration is performed is equal to the vehicle speed during the coasting braking.

[Shift] At the shift during the engine running or the motor running, motor generator MG performs the power running or the regeneration to adjust the rotational speed in accordance with the shift during the acceleration or the deceleration. Accordingly, the smooth shift is performed without a torque converter.

Figure 2:
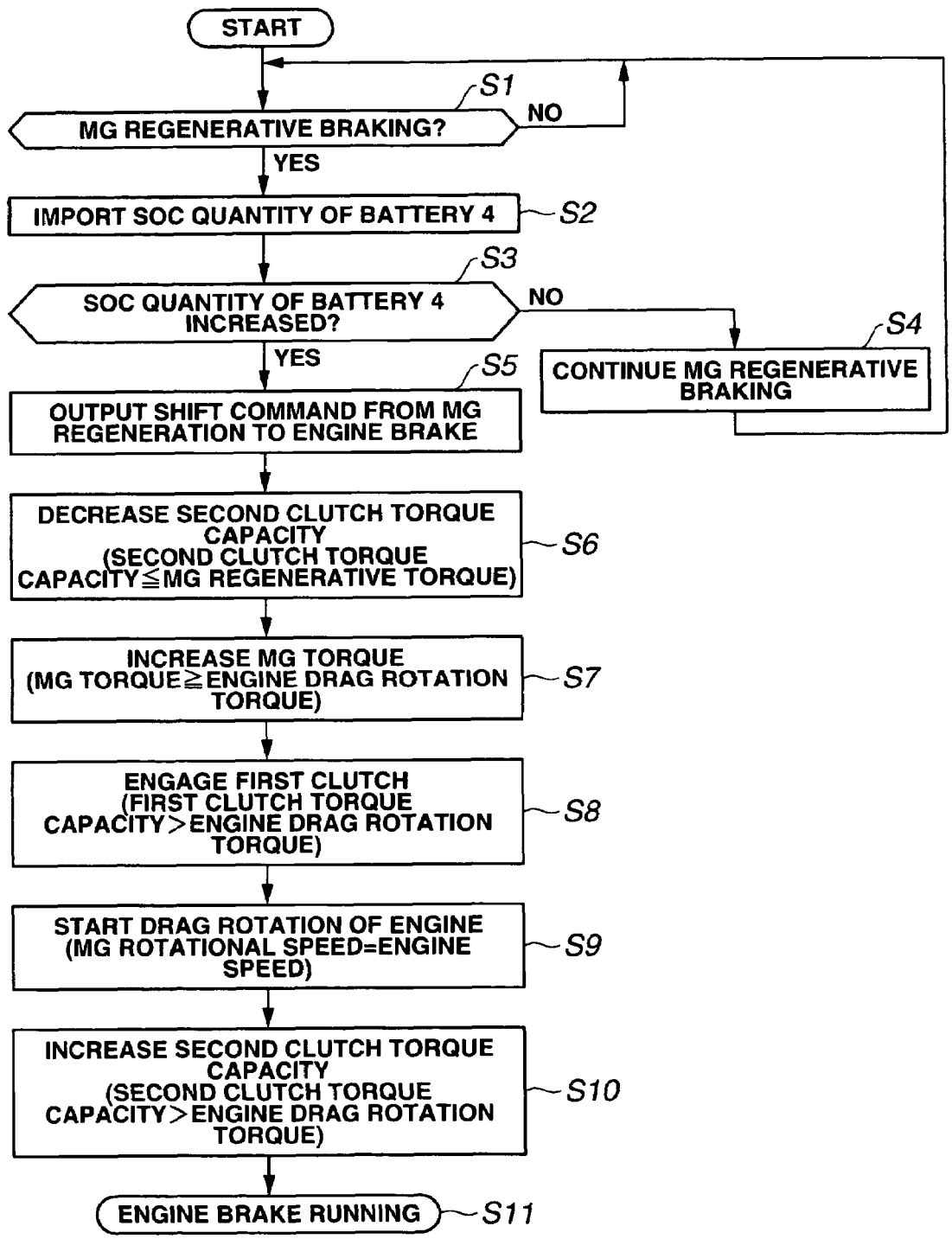
FIG. 2 is a flow chart showing a flow of a mode transition control operation from a motor regenerative braking mode to an engine braking mode, performed by an integrated controller of FIG. 1.

FIG. 2 shows a flow chart showing a flow of mode transition control operation from a motor regenerative braking mode to an engine braking mode, performed by integrated controller 10 (mode transition control section). Hereinafter, each step is illustrated.

At step S1, integrated controller 10 judges whether or not the regenerative braking by motor generator MG is performed in a running state (coasting state) in which the accelerator and the brake are not depressed. When the answer of step S1 is affirmative (YES), the process proceeds to step S2. When the answer of step S1 is negative (NO), and the process repeats the judgment at step S1.

Subsequently to the judgment of the motor generator regenerative braking at step 1, integrated controller 10 imports the SOC quantity of battery 4 at step S2, the process proceeds to step S3.

Subsequently to the importing of the SOC quantity of battery 4 at step 2, integrated controller 10 judges whether or not the SOC quantity of battery 4 is equal to or greater than a SOC upper limit value at step S3. When the answer of step S3 is YES, the process proceeds to step S5. When the answer of step S3 is NO, the process proceeds to step S4.

Subsequently to the judgment that the SOC quantity is lower than the SOC upper limit value at step 3, integrated controller 10 continues the regenerative braking performed by motor generator MG at step S4, and the process returns to step S1.

Subsequently to the judgment that the SOC quantity is equal to or greater than the SOC upper limit value at step 3, integrated controller 10 outputs a command for shift from the regenerative braking performed by motor generator MG to the engine brake at step S5, and the process proceeds to step S6.

Subsequently to the command for the shift from the regenerative braking performed by motor generator MG to the engine brake at step 5, integrated controller 10 outputs a command for dampening a torque capacity (engagement torque capacity) of second clutch CL2 at step S6, and the process proceeds to step S7. The damping of the torque capacity of second clutch CL2 is released in the slip state of second clutch CL2 so that regenerative torque of motor generator MG is equal to or greater than the second clutch torque capacity.

Subsequently to the damping of the torque capacity of second clutch CL2 at step 6, integrated controller 10 outputs a command for increasing the torque of motor generator MG at step S7, and the process proceeds to step S8. The torque increase of motor generator MG is so determined that the torque of motor generator MG is equal to or greater than the necessary torque (engine drag rotation torque) for the drag rotation of the engine.

Subsequently to the increasing of the torque of motor generator MG at step S7, integrated controller 10 brings first clutch CL1 to the engaged state at step S8, and the process proceeds to step S9. At step S8, the torque capacity of first clutch CL1 is so determined that the first clutch torque capacity is greater than the necessary torque for the drag rotation of the engine.

Subsequently to the engagement of first clutch CL1 at step S8, integrated controller 10 causes the drag rotation of engine E by motor generator MG, and holds the drag rotation of engine E until the engine speed of engine E is equal to the rotational speed of motor generator MG at step S9, and the process proceeds to step S10.

Subsequently to the conformity between the engine speed and the motor generator rotational speed by the drag rotation of engine E at step S9, integrated controller 10 increases the torque capacity of second clutch CL2 at step S10, and the process proceeds to step S11. At step S10, the torque capacity of second clutch CL2 is so determined that the second clutch torque capacity is greater than the necessary torque (engine drag rotation torque) for the drag rotation of the engine.

Subsequently to the increasing of the torque capacity of second clutch CL2 at step S10, integrated controller 10 finishes the shift to the engine brake at step S11. Consequently, the vehicle runs by using the engine brake.

[Motor Regenerative Braking Operation]

For example, when the vehicle runs on the long decline, accelerator opening sensor 16 senses whether the accelerator pedal is depressed or not, and brake stroke sensor 20 senses whether the brake pedal is depressed or not. At the judgment that the accelerator pedal and the brake pedal are not depressed, the regenerative braking by motor generator MG is performed in the disengaged state of first clutch CL1 and in the engaged state of second clutch CL2, so that battery 4 is charged.

While the SOC quantity of battery 4 is lower than the SOC upper limit value during the regenerative braking performed by motor generator MG, the process repeats the flow of step 1→step 2→step 3→step 4 in the flow chart of FIG. 2. At step S4, the regenerative braking by motor generator MG is continued.

Accordingly, in a case in which the above-mentioned long decline is further gentle, the vehicle tends to run in the coasting state in which the accelerator and the braking are not depressed. In this state, the regenerative braking by motor generator MG is continued as far as the SOC quantity of battery 4 is lower than the SOC upper limit value. Accordingly, it is possible to ensure the regenerative quantity fully, to expand the motor running range by motor generator MG, and thereby to improve the fuel economy.

[Mode Transition Control Operation]

For example, when the vehicle runs on the long decline, battery 4 is fully charged by the regenerative braking performed by motor generator MG, and the SOC quantity of battery 4 becomes equal to or greater than the SOC upper limit value. That is, battery 4 can not be charged any more, and it is necessary to shift from the motor regenerative braking to the engine brake. In this case, when engine E is coupled only by the engagement of first clutch CL1, the shock by the inertia and the friction of engine E is transmitted to left and right rear wheels RL and RR, and causes an unpleasant feeling to the driver.

In the example according to the embodiment of the present invention, battery 4 is fully charged by the regenerative braking, the SOC quantity of battery 4 becomes equal to or greater than the SOC upper limit value, and the process proceeds to step S3→step S5→step S6→step S7→step S8→step S9→step S10→step S11 in the flowchart of FIG. 2. The shift from the motor regenerative braking to the engine brake is completed.

That is, when integrated controller 10 judges that the SOC quantity of battery 4 reaches the SOC upper limit value, integrated controller 10 outputs the command for shift from the motor regenerative braking to the engine braking performed by engine E (step S5). In this case, the torque capacity of second clutch CL2 in automatic transmission AT is decreased to a sufficient quantity to transmit the torque necessary for the engine braking (step S6). Concurrently, the torque of motor generator MG is increased to the level necessary for rising the engine speed of the stopped engine to the same rotational speed as motor generator MG (step S7). Subsequently to the increase in the torque of motor generator MG, first clutch CL1 is engaged, and the engine speed of engine E is increased instantaneously by motor generator MG (step 8). In this time, the rotational speed of motor generator MG is decreased by the inertia and the friction of engine E. However, the variation in deceleration G by the decrease in the rotational speed is not transmitted to left and right rear wheels RL and RR because the torque capacity of second clutch CL2 is decreased sufficiently. Subsequently, the rotation of engine E and the rotation of motor generator MG are synchronized, and the rotational speed is recovered to the same level as the rotational speed of motor generator MG when the command for shift from the motor regenerative braking to the engine braking is outputted (step S9). Then, the torque capacity of second clutch CL2 is recovered to the same level as the torque capacity before the damping (step S10), and the shift to the engine braking is finished (step S11).

FIGS. 3A~3F shows a time chart for illustrating the mode transition operation, showing each operation until the shift from the motor regenerative braking to the engine brake is finished. FIG. 3A shows a characteristic of the depression degree of brake pedal. FIG. 3B shows a characteristic of the accelerator opening. FIG. 3C shows characteristics of the generated torque of engine E and the generated torque of motor generator MG. FIG. 3D shows characteristics of the engine speed of engine E and the rotational speed of motor generator MG. FIG. 3E shows characteristics of the torque capacity of first clutch CL1 and the torque capacity of second clutch CL2. FIG. 3F shows a characteristic of the deceleration G of the hybrid vehicle.

The characteristic of the depression degree of the brake pedal and the characteristic of the accelerator opening show that the brake and the accelerator are not operated on the gentle decline. The motor regenerative braking is maintained until time to. During this motor regenerative braking, first clutch CL1 is in the disengaged state, second clutch CL2 is in the engaged state, and engine E is the stopped state. Motor generator rotational speed Nm is held at substantially constant rotational speed through the transmission ratio of automatic transmission AT by the input from left and rear wheels RL and RR.

At time t1, when the command for shift from the motor regenerative braking to the engine brake is outputted, the torque capacity of second clutch CL2 in automatic transmission AT is decreased to the sufficient level for transmitting the torque necessary for the engine brake. Concurrently, the torque of motor generator MG is increased to the level necessary for raising the engine speed of the stopped engine to the same rotational speed as motor generator MG. Thus, the torque capacity of second clutch CL2 is decreased, the torque of motor generator MG is increased, and accordingly it is possible to certainly perform the slippage of second clutch CL2 at immediate response. Moreover, the torque capacity of second clutch CL2 is decreased to the sufficient level to transmit the torque necessary for the engine brake, and accordingly it is possible to ensure deceleration G by the engine brake until time t2 when first clutch CL1 starts to be engaged.

After the torque of motor generator MG is increased, first clutch CL1 initiates to be engaged at time t2. The engine speed of engine E is increased instantaneously by motor generator MG. In this time, the rotational speed of motor generator MG is decreased by the inertia and the friction of engine E. The variation in deceleration G by the decrease in the rotational speed is not transmitted to left and right rear wheels RL and RR because the torque capacity of second clutch CL2 is decreased sufficiently.

After motor generator rotational speed Nm is decreased between time t2 and time t3, motor generator MG causes the drag rotation of engine E through the engagement of first clutch CL1 until time t3 and t4. The engine speed of engine E and the rotational speed of motor generator MG are increased for a rotational synchronous characteristic. Motor generator torque Tm is increased for a characteristic corresponding to a variation characteristic of the decrease of the rotational speed. Engine torque Te is decreased for a characteristic corresponding to a variation characteristic of the increase of the engine speed. The average torque of motor generator torque Tm and engine torque Te becomes the torque transmitted to left and right rear wheels RL and RR of driving wheels.

At time t4, the engine speed of engine E and the rotational speed of motor generator MG are increased sufficiently, and motor generator rotational speed Nm is recovered to the same level as the rotational speed of motor generator MG when the command for shift from the motor generator braking to the engine braking is outputted. Then, the engagement of second clutch CL2 is started, and the torque capacity of second clutch CL2 is recovered to the same level as before the damping, at time t5. Consequently, the smooth shift to the engine brake is finished without causing the shock.

In the control apparatus according to the embodiment, when first clutch CL1 is engaged, the torque capacity of second clutch CL2 is decreased prior to the engagement of first clutch CL1, so that the shock by the connection of engine E is transmitted. Accordingly, it is possible to suppress the variation in deceleration G at the shift from the motor regenerative braking to the engine brake, and to prevent from affecting the driver's feeling adversely.

In the control apparatus according to the embodiment, the hybrid drive system includes first clutch CL1 disposed between engine E and motor generator MG, and second clutch CL disposed between motor generator MG and wheels RR and RL. The mode transition control apparatus includes an engine brake request judging section (step S3) configured to judge whether or not the request of the engine braking is present at the motor regenerative braking performed by the motor generator MG, and a mode transition control section configured to perform a mode transition control of the hybrid drive system in accordance with the transition request. The mode transition control section is configured to bring second clutch CL2 from the engaged state to the disengaged state when a command for shift from the motor regenerative braking to the engine braking is outputted in accordance with the judgment of the request of the engine brake (step S5), and to shift to an engine braking mode by bringing the first clutch from the disengaged state to the engaged state (step S6~step S11). Accordingly, it is possible to attain the smooth shift from the motor generator regenerative braking to the engine brake, and to prevent from affecting the driver's feeling adversely.

The mode transition control section is configured to bring second clutch CL2 to the slip state when the command for the shift from the motor regenerative braking to the engine brake is outputted, by decreasing the torque capacity of second clutch CL2 which is in the engaged state, to the sufficient level to transmit the torque of the engine brake when the command for the shift from the motor regenerative braking to the engine brake is outputted (step S6). Accordingly, it is possible to prevent the transmission of the shock by the connection of engine E, and to maintain deceleration G at the starting region of the shift from the motor regenerative braking to the engine brake.

The mode transition control section is configured to bring second clutch CL2 from the engaged state to the disengaged side when the command for the shift from the motor regenerative braking to the engine brake is outputted, and to increase the torque of the motor generator MG to a level greater than the torque necessary for the drag rotation of engine E (step S7). Accordingly, it is possible to surely operate the slippage of second clutch CL2 at the immediate response after the disengagement of second clutch CL2 is started.

The mode transition control section is configured to start to bring first clutch CL1 to the engaged state after increasing the torque of the motor generator MG, and to increase the engagement torque of first clutch CL1 to a level greater than the engine drag rotation torque (step S7). Accordingly, it is possible to cause the drag rotation of engine E by motor generator MG surely after the engagement of first clutch CL1.

The mode transition control section is configured to start the drag rotation of engine E by motor generator MG after bringing second clutch CL2 to the engaged state (step S9), and bringing first clutch CL1 to the disengaged state, and to bring (return) second clutch CL2 to the engaged state when the engine speed is equal to or greater than the motor generator speed when the command for the shift from the motor regenerative braking to the engine brake (step S10). Accordingly, it is possible to attain the shift to the engine brake at the appropriate timing without causing the variation in deceleration G.

The engine brake request judging section (step S3) is configured to judge the request of the engine brake when the battery charge capacity is equal to or greater than the upper level value during the motor regenerative braking in a coasting state. The mode transition control section is configured to hold the regenerative braking performed by motor generator MG when the request of the engine brake is not present at the motor regenerative braking (step S1~step S4). Accordingly, it is possible to ensure the maximum regenerative quantity, to expand the running region by motor generator MG, and to improve the fuel economy in the running scene on the long decline to run in the coasting state.

In the control apparatus according to the embodiment of the present invention shows the example which second clutch CL2 is disengaged in the slippage state. However, it is applicable to fully disengage second clutch CL2 prior to the engagement of first clutch CL1.

In this embodiment, the present invention is applied to the rear-wheel-drive hybrid vehicle. However, it is also applicable to the front-wheel-drive hybrid vehicle and the four-wheel-drive hybrid vehicle. Moreover, in this embodiment, the clutch in the automatic transmission is used for the second clutch. However, it is possible to add a second clutch disposed between the motor generator and the automatic transmission, and to add a second clutch disposed between the automatic transmission and the driving wheels (see Japanese Patent Application Publication No. 2002-144921). That is, it is applicable to the hybrid vehicle including the hybrid drive system having the first clutch disposed between the engine and the motor generator, and the second clutch disposed between the motor generator and the driving wheels.

This application is based on a prior Japanese Patent Application No. 2005-133398. The entire contents of the Japanese Patent Application No. 2005-133398 with a filing date of Apr. 28, 2005 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A mode transition control apparatus for a hybrid vehicle, the mode transition control apparatus comprising:
   a hybrid drive system including:
      a first clutch disposed between an engine and a motor generator; and
      a second clutch disposed between the motor generator and wheels;
   an engine braking request judging section configured to judge whether a request of an engine braking is present during a motor regenerative braking performed by the motor generator; and
   a mode transition control section configured:
      to perform a mode transition control of the hybrid drive system in accordance with a transition request,
      to decrease a torque capacity of the second clutch being in an engaged state in response to the judgment that the request of the engine braking is present, and
      to bring the first clutch from a disengaged state to an engaged state to shift to the engine braking.

2. The mode transition control apparatus as claimed in claim 1, wherein the mode transition control section is configured to bring the second clutch to a slip state, in response to the judgment that the request of the engine braking is present, by decreasing the torque capacity of the second clutch being in the engaged state to a level to transmit a torque of the engine braking.

3. The mode transition control apparatus as claimed in claim 2, wherein the mode transition control section is configured to bring the second clutch from the engaged state to the slip state in response to the judgment that the request of the engine braking is present, and to increase a torque of the motor generator to be equal to or greater than an engine drag rotation torque.

4. The mode transition control apparatus as claimed in claim 3, wherein the mode transition control section is configured to start to bring the first clutch to the engaged state after increasing the torque of the motor generator, and to increase a torque capacity of the first clutch to be greater than the engine drag rotation torque.

5. The mode transition control apparatus as claimed in claim 2, wherein the mode transition control section is configured to bring the second clutch to the slip state, to bring the first clutch to the engaged state, to start to cause a drag rotation of the engine by the motor generator, and to bring the second clutch from the slip state to the engaged state when an engine speed of the engine becomes equal to a rotational speed of the motor generator at the judgment that the request of the engine braking is present.

6. The mode transition control apparatus as claimed in claim 2, wherein the engine braking request judging section is configured to judge that the request of the engine braking is present when a battery charge capacity is equal to or greater than an upper level value during the motor regenerative braking in a coasting state; and the mode transition control section is configured to hold the regenerative braking performed by the motor generator when the request of the engine braking is not present during the motor regenerative braking.

7. The mode transition control apparatus as claimed in claim 1, wherein the mode transition control section is configured to decrease the torque capacity of the second clutch being in the engaged state to be equal to or lower than a regenerative torque of the motor generator.

8. A mode transition control method for a hybrid vehicle including a hybrid drive system having a first clutch disposed between an engine and a motor generator, and a second clutch disposed between the motor generator and wheels, the mode transition control method comprising:
   judging whether a request of an engine braking is present during a motor regenerative braking performed by the motor generator;
   performing a mode transition control of the hybrid drive system in accordance with a transition request;
   decreasing a torque capacity of the second clutch being in an engaged state in response to the judgment that the request of the engine braking is present; and
   bringing the first clutch from a disengaged state to an engaged state to shift to the engine braking.

9. A mode transition control apparatus for a hybrid vehicle, the mode transition control apparatus comprising:
   a hybrid drive system including:
      a first clutch disposed between an engine and a motor generator; and
      a second clutch disposed between the motor generator and wheels;
   first means for judging whether a request of an engine braking is present during a motor regenerative braking performed by the motor generator;
   second means for performing a mode transition control of the hybrid drive system in accordance with a transition request;
   third means for decreasing a torque capacity of the second clutch being in an engaged state in response to the judgment that the request of the engine braking is present; and
   fourth means for bringing the first clutch from a disengaged state to an engaged state to shift to the engine braking.

\* \* \* \* \*